UNITED STATES PATENT OFFICE.

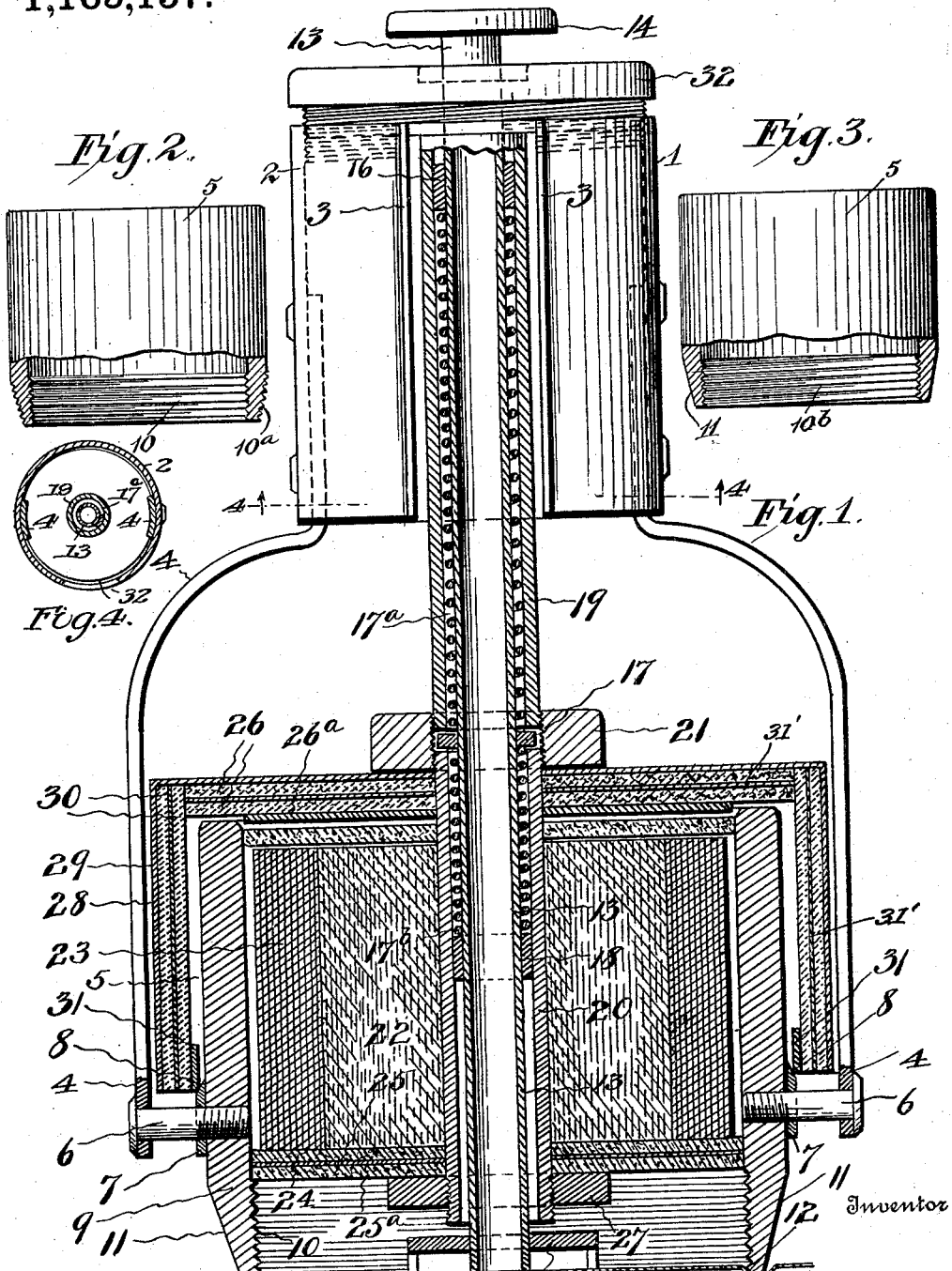

GARRY D. KING, OF COLUMBUS, GEORGIA.

SOLDERING-IRON.

1,163,157.

Specification of Letters Patent.  Patented Dec. 7, 1915.

Application filed June 23, 1913. Serial No. 775,349.

*To all whom it may concern:*

Be it known that I, GARRY D. KING, a citizen of the United States, residing at Columbus, in the county of Muscogee and State of Georgia, have invented certain new and useful Improvements in Soldering-Irons, of which the following is a specification.

My invention relates to improvements in soldering irons, and more partcularly to such as are designed for use in capping fruit cans and the like.

An object in view is the provision of a soldering iron which will place the solder in the proper place around the edge of the can and which also will carry a large amount of solder on or in close proximity to its working edge and which will perform a maximum amount of work with a minimum amount of solder.

My invention has for a further object the provision of a soldering iron which is capable of being easily heated without injury to the tinned end, and which will retain heat for a considerable time.

Another object of my invention is the provision of a soldering-iron for use in melting solder on solder-hemmed can-caps and applying the same to the sealing of the cap on to the can, for melting drop-solder and applying it around the edge of the can-cap, and for melting the caps from cans without injuring the cans or their contents or unduly heating the same. And still another object of my invention is the provision of a soldering-iron which is simple, inexpensive, and durable in construction and easy and effective in operation.

With these and still further objects in view, as will in part hereinafter be specified and in part become apparent, the invention comprises certain novel constructions, combinations and arrangements of parts as will subsequently more fully appear and be particularly pointed out in the claims.

In the accompanying drawing: Figure 1 is a central vertical section of a soldering-iron embodying the features of the invention. Figs. 2 and 3 are enlarged detail views partly in section and partly in elevation of modified forms of the soldering end of the soldering iron. Fig. 4 is a transverse section taken on the plane indicated by line 4—4 of Fig. 1, and looking upward.

Referring to the drawing by numerals, 1 indicates a handle consisting of a sleeve or grip 2 and a bail formed of arms 4, 4, fixed to and extending axially from the sleeve. The grip 2 is formed with a longitudinal slot 3 for purposes hereinafter mentioned.

Pivoted to swing between the arms of the bail is the body 5 of the soldering-iron, which consists of a hollow cylindrical section having a longer portion at one side of its pivots than that at the other side, the shorter portion 9 tapering at 11 to form a soldering edge 12. The inner surface of portion 9 of the body 5 is formed with annular grooves 10 for receiving and carrying a supply of solder. The grooves 10 are formed either annular or spiral or otherwise disposed for producing flutings or threads. The spiral form is seen in detail at $10^b$ in Fig. 3, while in Fig. 2 the annular form is seen at 10 and in this figure also the outer or inclined surface is provided with solder-carrying grooves $10^a$. This form, with the inner and outer grooves, may be considered preferable for the purposes of the appended claims, since the maximum supply of solder may be carried thereby.

The arms 4 carry at their outer free ends bolts or pivot pins 6 which are threaded into or otherwise connected to the body 5 for forming the pivots thereof, said bolts extending through a band or sleeve 7 fixed to the body 5 and provided at its upper edge portion with a bevel 8 for enabling a wedging of the body into rigid relation to inclosing parts as will be hereinafter pointed out. A tube or pressing rod 13 is arranged to extend centrally within and to be removable from the sleeve 2 through slot 3, the upper end of the tube 13 carrying a knob or head 14 by which the tube is adapted to be shifted longitudinally.

To the lower end portion of tube 13 is fixed a clamping plate 15 which is adapted in operation to engage and hold a cap on a can while the body 5 is being moved away from the cap so that the edge 12 can be withdrawn without liability of pulling the cap of the can loose while the solder is still soft. The plate 15 is shown as provided with a pendent annular flange which is notched vertically as is seen in Fig. 1, and when the flange is employed, its edge serves as the can-cap engaging means instead of the underface of the plate 15 itself. To effect this result in the most convenient manner, a spring $17^b$ surrounds the plunger or tube 13 and is connected therewith for pressing the same axially in the direction of the soldering end of the apparatus, that is, in operation, downward so that after the soldering operation has been completed when the body 5 is being withdrawn from the can cap the expansive force of the spring will act to retain the flange of plate 15 down upon the cap and allow the removal of the soldering body 5 without permitting the cap to follow and be lifted out of place, so that when the body 5 has been entirely withdrawn, the plate 15 and lower end of plunger or tube 13 are projected below the edge of the body 5. This operation of the plunger 13 and plate 15 is desirable when solder hemmed caps are employed, but would not be desirable where the soldering end of body 5 had to be dipped into molten solder. The mode of engagement of spring $17^b$ obviously may be varied to any extent desired, and one effective means of connection consists of a sleeve 18 fixed to plunger 13 and engaged by the lower end of the spring while the upper end of the spring engages an annulus or washer 17 which loosely surrounds the sleeve and is held by parts hereinafter described so as to remain stationary when the plunger 13 is moved. In some instances, it may be desirable to employ a counter-balancing spring $17^a$ disposed between the annulus 17 and a sleeve 16 fixed to the upper portion of plunger 13. When it is desired that the operation shall be accomplished in the manner just described, which is the preferable operation, the spring $17^a$ will not be sufficiently strong to entirely counter-balance the spring $17^b$. However, a converse operation is desirable when the iron is to be dipped into molten solder, and in that event the spring $17^a$ would be made stronger than spring $17^b$ so as to keep the plate 15 normally elevated and permit actuation thereof manually for holding it down in place to prevent the can cap from following the soldering-iron as the soldering iron is being moved. This construction and operation will not ordinarily be preferred since both hands of the operator would be required, whereas, by making the spring $17^b$ strong enough to project plate 15 as the soldering-iron is being moved away from the cap, a soldering operation may be accomplished by one hand of the operator. The plunger 13 may be any form of rod but the tubular rod shown is preferred since when can caps provided with a central exhaust opening are employed, an exhaust passage is provided through the tube 13.

Tubes 19 and 20 are provided above and below the washer 17, respectively, which are concentrically arranged around the slidable tube 13, and their inner ends are joined or connected together by means of a screw-nut 21. A cylindrical block 22, of wood or other light material is mounted on the tube 20 and a series of asbestos strips 23 are wound around it in layers. Asbestos strips 24 25 and a tin plate $25^a$ are provided below the block 22 and an asbestos strip 26 and tin plate $26^a$ above the same and 27 is a screw-nut for retaining the several parts on the tube 19. The core consisting of parts 22, 23, 24 and 25 and connected parts has a sliding fit within the cylindrical body 5.

The exterior of the body 5 of the soldering-iron is inclosed in a casing 28, secured onto the tube 20, and comprising an outer covering 29, preferably made of tin, and strips 30 of asbestos and a strip 31 of metal. The casing 28 and its connected parts are movable longitudinally of the body 5 so as to be shiftable axially of the body when the movable internal core is likewise shifted. Between the strips 30 and between the strips 26 are arranged the metallic sheets 31', the sheet 31' between the strips 30 being in the form of a cylinder, and the sheet 31' between the strips 26 being in the form of a disk or annulus.

The screw cap 32 is penetrated by the plunger 13 so that the plunger is slidable therethrough, the cap 32 being fixed to the upper end of the tube 19 so that when the cap 32 is moved down into the sleeve 2, the sleeve is caused to move longitudinally in one direction while the tube 19 is forced longitudinally in the other direction with the result that the core 20 and connected parts and casing 28 and connected parts are moved downward while the body 5 is pulled upward so that the strip 31 of casing 28 is caused to engage the beveled upper edge portion 8 of band 7, which results in producing a tight joint or connection between the several parts, and thus renders body 5 with its heat retaining elements substantially rigidly connected. Thus, the handle 1 may be utilized with facility in operating the body 5.

It will be understood that the working edge of the soldering-iron is not trimmed to a sharp point, but a sufficient surface is left to straddle the seam, where the can-cap meets the can, in the groove around the cap. Otherwise the edge of the soldering-iron might go into the seam where the solder should go.

When it is desired to heat the iron, the cap 32 is detached from engagement with sleeve 2 and the tube 13 with its connected parts is swung laterally through slot 3, and when free from sleeve 2 the tube 13 and the parts carried thereby including the heat-confining core and jacket for body 5 are withdrawn axially from said body so that the tubular body 5 is left bare and empty. Body 5 is disposed at any desired or convenient angle to the handle, and that portion of the body 5 at the opposite side of pivot 6 from portion 9 is placed in the flame or place for receiving the direct action of the heat and the copper or other appropriate metal of which body 5 is formed will readily distribute the heat down into the tapered portion. When the body 5 has been properly heated the tube 13 and its connected parts are reapplied axially, the tube 13 is returned to its position within handle 2, and the iron is ready for use. The cap 32 and tube 19 and connections serve as the operating member for enabling swinging the body 5 to and from the heating position, in addition to acting as a carrier for the core and jacket.

The apparatus being ready for work, where solder-hemmed caps or dropped solder are used, the operation is simple. The soldering apparatus is placed in working position, as shown in Fig. 1; the working edge, touching the slant in the can-cap only, melts the solder on the same simultaneously all around, if a solder-hemmed cap is used, and with drop solder the working edge takes all the solder upon its working edge before coming in contact with the can-cap, and when the solder is melted, which the operator will know by feeling it give way for the iron, the working edge comes immediately into momentary contact with the slanting edge of the can. When the soldering-iron is raised from the can the sliding rod is held down momentarily, straddling the vent-hole of the can-top. This completes the work of soldering the cap on the can.

When it is desired to perform a neat job with but little solder and to do it quickly, the soldering edge of the iron is touched lightly to melted solder and then placed in working position, the working edge carrying the solder to the can-cap and placing it immediately upon the slanting edge of the can-cap. The solder then runs to the outer edge of the can-cap and is located between the edge of the can-cap and the top of the can at the point of contact with the can, thus placing solder in the seam and completing the job of soldering the cap on the can, the iron being immediately raised from the can, while the sliding rod and clamp holds the cap in its place.

The small groove on the inside working edge of the soldering-iron will help the iron to hold a considerable quantity of solder and insure a full supply of the same for sealing one or more cans with one dip into the melted solder.

The portion of the soldering end of the iron being straight on the inside circumference for a considerable distance upward, and being of sufficient opening to pass along the slanting edge of the can-cap, renders it unnecessary to ever file or beat the working edge to a point or to re-tin the same, and since the iron is reversible and the working edge never comes in contact with fire or soot it is always in condition for being heated and for continual use, and in the event that any wearing is done it wears to fit the slant in the can-cap, and constantly re-tins itself, it only being necessary to keep the outside edge of the soldering edge of sufficient thinness to prevent the same from coming in touch with the can until the inside edge has come in contact with the can-cap.

I do not wish to be restricted to the exact construction as herein shown and described, as the same may be varied somewhat without departing from the spirit and scope of my invention.

Having thus described my invention, what I claim is—

1. In a soldering-iron, the combination with a soldering-iron body, of a handle pivotally carrying the body and having a lateral opening, and means engaging the body for swinging the same on its pivot, said body-engaging-means extending in position for being moved laterally into and out of the opening of the handle during pivotal movement of the body.

2. In a soldering-iron, the combination with a soldering-iron body, of a handle therefor pivotally sustaining the body and having an opening, and an operating member for the body having means of engagement with the body and shiftable relative thereto, the said operating member being adapted to swing with the body pivotally into and out of the opening in the handle.

3. In a soldering-iron, the combination with a soldering-iron body, of a handle therefor pivotally sustaining the body and having an opening, and an operating member for the body having means of engagement with the body and shiftable relative thereto, the said operating member being adapted to swing with the body pivotally into and out of the opening in the handle, the shiftable mobility of the operating member being in a direction axially of the iron for enabling the member to hold an article against movement while the iron is being withdrawn axially from such article.

4. In a soldering-iron, the combination with a soldering-iron body, of a handle pivotally carrying the body and extending away from the same, and an operating member having heat-retaining means coöperating with the body and adapting the operating member to move the body upon its pivot, the said member being adapted to be moved into coöperative relation with the handle for enabling both the handle and the operating member to be grasped in the hand of the operator.

5. In a soldering-iron, the combination with a hollow soldering-iron body, of a handle pivotally carrying said body and having an opening, a heat-retaining core movable axially into and out of the body, and an operating member for said core adapted to be operated to move the body upon its pivot, said member extending into position for moving laterally into and out of the opening in the handle.

6. In a soldering-iron, the combination with a soldering-iron body, of a handle pivotally carrying the body and extending away from the same, and an operating member having heat-retaining means coöperating with the body and adapting the operating member to move the body upon its pivot, the said member being adapted to be moved into coöperative relation with the handle for enabling both the handle and the operating member to be grasped in the hand of the operator, the operating member being shiftable relative to its heat-retaining means.

7. In a soldering-iron, the combination with a hollow soldering-iron body, of a handle pivotally carrying said body and having an opening, a heat-retaining core moving axially into and out of the body, and an operating member for said core adapted to be operated to move the body upon its pivot, said member extending into position for moving laterally into and out of the opening in the handle, the operating member being shiftable axially relative to the core.

8. In a soldering-iron, the combination with a soldering-iron body, of a handle pivotally carrying the body and extending away from the same, an operating member having heat-retaining means coöperating with the body and adapting the operating member to move the body upon its pivot, the said member being adapted to be moved into coöperative relation with the handle for enabling both the handle and the operating member to be grasped in the hand of the operator, the operating member being shiftable relative to its heat-retaining means, and a heat-retaining jacket carried by the operating member and adapted to removably inclose a portion of the body.

9. In a soldering-iron, the combination with a hollow soldering-iron body, of a handle pivotally carrying said body and having an opening, and a tube extending axially through the body and adapted to swing the body upon its pivot and to move laterally into and out of the opening in the handle, said tube being axially shiftable relative to the body.

10. In a soldering-iron, the combination with a hollow soldering-iron body, of a handle carrying said body, a tube extending through and slidable relative to the body, axially alined tubes inclosing the first mentioned tube, and heat-retaining means carried by one of the second mentioned tubes and surrounding the body.

11. In a device of the character described, a handle, a soldering-iron provided therein, a slidable tube, upper and lower tubes inclosing the same, a washer between said tubes, said last-mentioned tubes and said washer holding said soldering-iron in position, and heat-retaining means surrounding the iron aforesaid and engaging the lower tube.

12. In a soldering iron, the combination of a soldering-iron body, a handle pivotally carrying the body, an operating member for the body, the body being formed at different points with inclined portions, and means connected with the operating member and adapted to be moved along the inclined portions for being tightened thereon for rendering the body relatively rigid with the operating member.

13. In a soldering iron, the combination of a pivotally mounted cylindrical body, a tube shiftable axially within the body, a plunger rod shiftable longitudinally within the tube, and a spring pressing said rod axially, the rod and spring being proportioned to enable the rod to move beyond the soldering portion of the cylindrical body.

14. In a soldering iron, the combination of a cylindrical, pivotally mounted, tubular body, a heat confining core shiftable axially of and within the body, and a spring pressed cap retainer shiftable axially of and within the core and disposed to be projected beyond the soldering portion of the body.

15. In a soldering-iron, the combination, with a cylindrical body, of a cap retainer movable relative to and within the body, a spring pressing the cap retainer in a direction to project the same beyond the body for enabling the body to be removed from a soldering position while the cap retainer remains in engagement with the soldered element under the spring pressure, and a spring engaging the cap retaining means and tensioned to press the same in the opposite direction from the direction of tension of the first mentioned spring but of sufficiently less spring pressure than the first mentioned spring to permit actuation of the cap retaining means by the first mentioned spring.

In testimony whereof I affix my signature in presence of two witnesses.

GARRY D. KING.

Witnesses:
W. CECIL NEILL,
JOHN H. LEWIS.